UNITED STATES PATENT OFFICE.

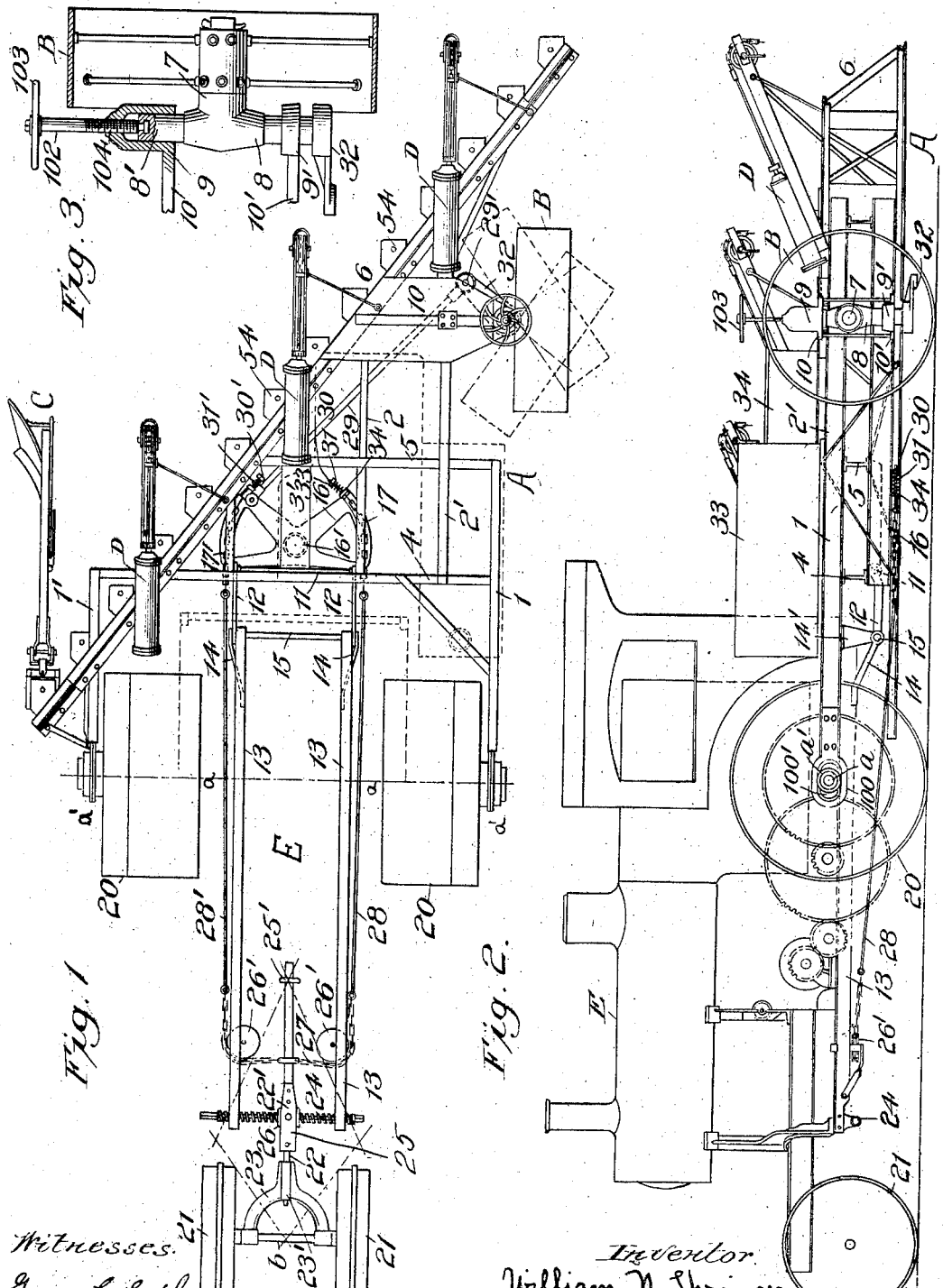

WILLIAM N. SPRINGER, OF PEORIA, ILLINOIS, ASSIGNOR, BY MESNE ASSIGNMENTS, TO AVERY COMPANY, A CORPORATION OF ILLINOIS.

STEAM-PLOW.

998,267.  Specification of Letters Patent.  Patented July 18, 1911.

Application filed July 31, 1907. Serial No. 386,383.

*To all whom it may concern:*

Be it known that I, WILLIAM N. SPRINGER, a citizen of the United States, residing at Peoria, in the county of Peoria and State of Illinois, have invented certain new and useful Improvements in Steam-Plows, of which the following is a specification, reference being had therein to the accompanying drawing.

This invention relates to steam plows, and has for its objects to improve the draft connections between the tractor and the gang plow frame, the means for steering the plow frame, and other features of the plow framework as will be hereinafter pointed out.

In the accompanying drawings—Figure 1 is a top plan view of an apparatus embodying my invention, the tractor being represented merely by portions of its framework and its supporting wheels. Fig. 2 is a side elevation of the apparatus, parts of the tractor being omitted. Fig. 3 shows the steering wheel detached.

In the drawings the framework of the gang of plows is represented as being connected with a tractor, which may be of any preferred construction, that shown being a steam traction engine similar to that illustrated and described in my Patent No. 842,589, dated January 29, 1907. This engine is designated, as a whole by E, and is provided at its rear with a set of large drive wheels 20 and at its forward end with steering wheels 21.

A indicates, as an entirety, the gang plow frame, B the steering wheel upon which it is mounted, C one of the plows and D, D, the motors carried by the frame and arranged to raise or lower the plows.

The frame A is preferably triangular in shape and comprises a set of longitudinally arranged horizontal beams or bars 1, 1', 2, 2', 3', transverse beams or bars 4 and 5, and diagonally arranged I-beam or plow beam 6. All of these frame parts are rigidly secured together in any suitable or well known manner, and the gang plow beam is preferably, for the sake of lightness, of skeleton construction.

The draft from the traction engine is applied substantially centrally to the gang plow frame through a pair of draft bars or links 12, 12, supported at their rear ends upon a rod or shaft 11 suitably mounted in the plow frame, and at their forward ends upon a shaft or rod 15 supported from the engine frame. The rod 15 is preferably mounted in depending brackets or hangers 14' which depend from the engine frame in rear of the main axle $a$ and are suitably braced by bars 14. This method of connecting the tractor frame with the plow frame is direct, and yet sufficiently flexible to permit each frame to follow the ground, the surface of which is often uneven, without interfering with the other, or with the draft being effectively applied from the tractor to the plow frame whatever be the relative positions of these two mechanisms.

It is desirable and advantageous to have the draft applied to the plow frame substantially centrally, but when the plow frame is broad, as represented in the drawings, and it and the gang of plows carried thereby extend well outward beyond the tread or base lines of the tractor, it is desirable to give to the forward end of the plow frame vertical support outside the lines of the engine or tractor. I provide for this by extending forward the longitudinal frame bars or beams 1, 1', and supporting them at their forward ends upon the main axle $a$ of the engine. This axle is preferably provided at each end with a hub or collar $a'$, and with this collar or hub engages a bearing plate 100 secured to the forward end of one of the said longitudinal bars. The bearing plate 100 is longitudinally slotted, as indicated at 100', thus permitting the slight longitudinal movements between the plow frame and the engine axle that necessarily take place owing to the pivotal lines of the draft connections 12 being distant from the axle $a$. It will be understood that the frame connections with the main axle just described are not for draft purposes but for vertical support and steadying of the frame.

The supporting and steering wheel B for the plow frame is mounted near the rear end of the frame A and on the left hand or land side thereof, it being preferably supported so that its track lies outside the track of the left hand drive wheel of the engine. The wheel is secured upon a stub axle 7 that projects laterally from a vertically disposed shaft 8 mounted in suitable bearings 9, 9'. The latter are supported at the outer ends of horizontally arranged plates 10, 10' mounted upon or constituting part of the plow frame. 11)

The upper end of the upper bearing, 9, is preferably closed and has formed in it a screw threaded aperture 104 to receive the vertical adjusting shaft 102 that has suitable engagement with the shaft 8. A hand wheel 103 is arranged at the upper end of the shaft 102. By these adjusting devices the vertical disposition of the plow frame may be varied as desired. The shaft 8 is free to turn in its bearings 9, 9', and is provided at its lower end with a crank arm 32 that is connected, by a link 29, with a steering wheel or segment 16 mounted upon a vertical axle or shaft 16', supported in the plow frame substantially centrally thereof. The wheel or segment 16 is connected with the steering devices of the tractor or engine E. While these steering devices may be of any usual or preferred construction I prefer that they should be of the kind illustrated in my aforesaid patent, and in the accompanying drawings I have illustrated some of the parts therein shown and described.

As represented in the drawings the front axle $b$ of the engine on which are mounted the steering wheels 21, has secured to it a steering fork 23, into a sleeve 23' of which extends a rod 22 pivotally connected with a movable frame 25 that carries a nut 26 mounted upon and having engagement with the transverse screw threaded shaft 24. This latter is suitably mounted in the frame of the engine, which frame is not illustrated in detail, only the longitudinal beams 13 thereof being represented in Fig. 1. The frame 25 extends rearward beyond the screw threaded shaft 24 and is mounted at its rear in a loop guide 25' in which it is free to turn as the nut 26 is adjusted to one side or the other along the screw shaft. Chains 27 are connected with the rearwardly extending portion of the frame 25 whence they pass around suitable guiding pulleys 26' and are connected respectively with the rearward extending rods 28, 28'; the latter being in turn connected with short sections of chain 17, 17'. These chains lie in peripheral grooves formed in the wheel or segment 16 on opposite sides of the pivot thereof. It will be apparent that the rotation of the shaft 24 operates to move the nut 26 to one side or the other according as the shaft is turned and this movement through the connecting parts shown and described turns the wheels 21, and the steering wheel or segment 16, which latter through the rod 29 turns the wheel B supporting the plow frame. The connections are such that the wheels, 21 and B, are set so as to cause a short-turning of the compound frame comprising the tractor and the gang-plow frame.

As the wheel B is liable to meet with obstructions I have found it desirable to include certain yielding devices in the connections between it and the screw shaft 24, in order to prevent disastrous strains upon the parts, which are likely to occur should rigid or unyielding connections be employed. I prefer to provide these yielding connections as follows. 30 indicates a rod connected to the rear end of the chain 17 and extending through a perforated lug 34 carried by the segment 16. A coiled spring 31 surrounds the rod 30, bearing at one end against the lug 34, and is held under tension by a nut 33 engaging with a screw threaded portion of the rod 30. A corresponding tension device is secured to the end of the chain 17'.

What I claim is:—

1. The combination with a tractor and a gang plow frame, of draft connections between the two, and supporting connections between the plow frame and the main axle of the tractor, the connections with the axle being free to move longitudinally relatively thereto, substantially as set forth.

2. The combination with a traction engine and a gang plow frame, of draft connections between the two, and supporting connections between the plow frame and the engine frame, said supporting connections having sliding engagement with the engine frame at points approximately in a vertical plane of the driving axle of the engine, substantially as set forth.

3. The combination with a traction engine and a gang plow frame, of flexible draft connections between the plow frame and the rear end of the engine frame, and supporting pieces rigid with the plow frame and extending forward therefrom to points approximately in the vertical plane of the axle of the engine driving wheels, said supporting piece being connected to the engine frame with freedom for limited backward and forward movement, substantially as set forth.

4. The combination of a tractor, a gang plow frame extending laterally beyond the lines of the tractor and having forward extending frame pieces on either side thereof, draft connections between the tractor and central portions of the plow frame, bearing pieces carried by the said forward extending pieces of the plow frame, and bearings carried by the main axle of the tractor, the bearing pieces having sliding engagement with said bearings to permit a limited relative movement, substantially as set forth.

5. The combination of a tractor, a gang plow frame extending laterally beyond the lines of the tractor and having forward extending frame pieces on either side thereof, draft connections between the tractor and central portions of the plow frame, bearing pieces carried by the said forward extending pieces of the plow frame, and bearings carried by the main axle of the tractor with which the said bearing pieces have engagement, the bearing pieces being slotted to allow them to move longitudinally to a limited extent, substantially as set forth.

6. The combination with a traction engine and a gang plow frame, of draft connections between the two, and supporting connections between the plow frame and the engine frame, said supporting connections having combined sliding and swinging engagement with the engine frame at points approximately in the vertical plane of the driving axle of the engine, substantially as set forth.

7. The combination with a tractor, of a gang plow frame connected to said tractor, means for supporting the frame from the ground comprising a wheel arranged to swing about a vertical axis, a steering segment arranged centrally on the plow frame and supported on a vertical axis, actuating connections secured one to each side of the segment and extending forward to be actuated from the tractor, and connections between the steering segment and the supporting wheel through which the latter is swung, substantially as set forth.

8. The combination with a tractor and a gang plow frame, of a supporting wheel for the plow frame arranged to swing about a vertical axis, a steering segment supported upon the plow frame, connections between the said segment and the supporting wheel for swinging the latter, and connections for turning the segment extending forward to the tractor, such connections including yielding devices, substantially as set forth.

9. The combination of a gang plow frame, a supporting wheel therefor, a vertically disposed shaft carrying the said wheel and its axle, the shaft being provided with a crank arm, a steering segment 16 mounted upon the frame, a connecting link between the said crank arm and the steering segment, and flexible draft devices having connection with the steering segment on opposite sides of its pivot and arranged to be connected with operating devices leading to the steering mechanism for the tractor, substantially as set forth.

10. In a gang plow, the combination of a main frame, a supporting wheel therefor, an axle upon which the wheel is mounted having vertical trunnions extending above and below the said axle, bearings on the main frame for said trunnions, a screw mounted in one of the trunnion bearings and engaging the trunnion therein to effect the vertical adjustment of the wheel, and steering devices for swinging the axle on its trunnions, substantially as set forth.

In testimony whereof I affix my signature, in presence of two witnesses.

WILLIAM N. SPRINGER.

Witnesses:
JEAN CALDWELL,
A. L. GREGORY.

Copies of this patent may be obtained for five cents each, by addressing the "Commissioner of Patents, Washington, D. C."